(12) United States Patent
Katagiri et al.

(10) Patent No.: US 7,703,623 B2
(45) Date of Patent: Apr. 27, 2010

(54) LID DEVICE

(75) Inventors: Katsuhiro Katagiri, Aichi-ken (JP); Masaki Ohmiya, Aichi-ken (JP)

(73) Assignees: Toyoda Gosei Co., Ltd., Aichi-pref. (JP); Toyota Jidosha Kabushiki Kaisha, Aichi-pref. (JP)

( * ) Notice: Subject to any disclaimer, the term of this patent is extended or adjusted under 35 U.S.C. 154(b) by 330 days.

(21) Appl. No.: 11/444,386

(22) Filed: Jun. 1, 2006

(65) Prior Publication Data

US 2006/0273090 A1 Dec. 7, 2006

(30) Foreign Application Priority Data

Jun. 3, 2005 (JP) ............... 2005-164257

(51) Int. Cl.
*B65D 43/26* (2006.01)

(52) U.S. Cl. .............. 220/264; 220/254.5; 220/830; 220/835; 224/282; 224/483; 296/37.8

(58) Field of Classification Search .......... 220/254.5, 220/264, 830, 835; 224/483, 282; 296/37.8
See application file for complete search history.

(56) References Cited

U.S. PATENT DOCUMENTS 5,639,002 A * 6/1997 Weitbrecht et al. ........ 224/539

7,231,692 B2 * 6/2007 Harada .................. 16/345
2003/0071047 A1 4/2003 Harada
2006/0054630 A1 * 3/2006 Katagiri ................ 220/830

FOREIGN PATENT DOCUMENTS

| JP | U-61-44338 | 3/1986 |
|---|---|---|
| JP | A-02-204143 | 8/1990 |
| JP | A-2-267038 | 10/1990 |
| JP | A-06-247203 | 9/1994 |
| JP | A-08-244536 | 9/1996 |
| WO | WO 01/71141 | 9/2001 |

OTHER PUBLICATIONS

Office Action dated Jan. 3, 2008 in corresponding Chinese Patent Application No. 200610083141.X (and English translation).
Office Action dated Oct. 15, 008 in corresponding Japanese patent application No. 2005-164257.

* cited by examiner

*Primary Examiner*—Anthony Stashick
*Assistant Examiner*—Elizabeth Volz
(74) *Attorney, Agent, or Firm*—Posz Law Group, PLC

(57) ABSTRACT

A lid device driving an opening operation of a lid body by an urging member such as a coil spring and capable of opening the lid body securely. Of a guide portion for guiding an engaging end of the urging member of the lid device, a first guide portion for guiding the engaging end in moving the lid body from a closed position to an open position is provided with an initial guide portion and a later guide portion so that the urging member releases a large urging force when the engaging end is guided by the initial guide portion.

8 Claims, 4 Drawing Sheets

LID DEVICE

BACKGROUND OF THE INVENTION

1. Field of the Invention

The present invention relates to a lid device for opening and closing an opening of a storage structure.

2. Description of the Related Art

There are a variety of known lid devices for opening and closing openings of storage structures, but opening and closing operations of the lid devices sometimes impose, on a user, a burden which depends on the kind of storage structures. For example, a glove box for a vehicle is a kind of storage structure and mounted in a small-spaced passenger room. Therefore, a user needs to perform opening and closing operations of a lid body in a small space and sometimes finds it difficult. Under these circumstances, a lid device has been developed which is capable of opening and closing a lid body easily by driving automatically (For example, Japanese Unexamined Patent Publication No. H02-267038). In the lid device disclosed in this Japanese patent document, a motor starts upon a user manually applying a force to start an opening or closing operation of the lid body, and then the motor drives the lid body to be opened or closed. In such a lid device, an opening or closing operation of the lid body can be carried out by a simple operation of the user, without imposing a burden on a user. On the other hand, since the motor is expensive, there is a problem that production cost of the lid device increases.

It is assumed that production cost of the lid device can be reduced if the opening or closing operation of the lid body is driven by an urging member such as a spring instead of the motor. In this case, for example, if an urging force is accumulated by stretching or compressing the urging member in association with opening or closing the lid body, the accumulated urging force can drive at least part of the opening or closing operation of the lid body.

In general, a lid device is provided with a lock means and a lid body is locked in a closed position by the lock means. In opening the lid body, the lock means is operated so as to release the locked state of the lid body. In order to simplify the opening operation of the lid body, the lid body needs to be opened by a single operation of the lock means. Therefore, it is demanded that the lid device has a function of driving the opening operation of the lid body by an urging member at the same time as releasing the locked state of the lid body. By the way, the center of gravity of the lid body sometimes lies on the closing side of the lid body in a manner that depends on the shape or location of a storage structure. For example, when the storage structure is a glove box mounted on a vehicle and the vehicle is parked on a slope, the center of gravity of the lid body may lie on the closing side of the lid body. When the center of gravity of the lid body lies on the closing side of the lid body, a force to move to a closed position under its own weight is applied on the lid body and a large urging force is required to drive the opening operation of the lid body. Therefore, in this case, sometimes the lid body is not opened by a single operation of the lock means. When the lock means has a certain mechanism, sometimes the lid body is not only unopened but also locked again in a closed position.

SUMMARY OF THE INVENTION

It is an object of the present invention to provide a lid device which drives an opening operation of a lid body by an urging force and is capable of opening the lid body securely.

A lid device according to the present invention, which attains the above object, comprises: a lid body moving between an open position for opening an opening of a storage structure and a closed position for closing the opening of the storage structure; a lock means for locking the lid body in the closed position; a guide portion formed on the storage structure; and an urging member having one end fixed to the lid body so as to be held by the lid body and the other end engaging and guided by the guide portion so as to be stretched or compressed and thereby accumulate an urging force in association with part of opening and closing movements of the lid body, the urging force driving at least an opening operation of the lid body, the guide portion comprising a closed end portion in which the engaging end is placed when the lid body is placed in the closed position; an open end portion in which the engaging end is placed when the lid body is placed in the open position; a first guide portion connecting the closed end portion and the open end portion and guiding the engaging end when the lid body moves from the closed position to the open position; and a second guide portion connecting the closed end portion and the open end portion and guiding the engaging end when the lid body moves from the open position to the closed position, the first guide portion comprising an initial guide portion connected to the closed end portion, a later guide portion connected to the open end portion, and a connecting portion connecting the initial guide portion and the later guide portion, and the urging member releasing a larger urging force when the engaging end is guided by the initial guide portion than when the engaging end is guided by the later guide portion.

It is preferable that the lid device according to the present invention comprises the following configuration (1) or (1) and (2).

(1) A fixed line segment connecting a closed fixed position in which the fixed end is placed when the lid body is placed in the closed position and an open fixed position in which the fixed end is placed when the lid body is placed in the open position, and an initial line segment connecting the connecting portion and the closed end portion extend in directions to cross each other; and an angle formed by the fixed line segment and the initial line segment is greater than an angle formed by a later line segment connecting the connecting portion and the open end portion, and the fixed line segment.

(2) In the above configuration (1), the initial line segment is shorter than the later line segment.

The lid device according to the present invention has the following advantages.

In the lid device according to the present invention, an urging force is accumulated in the urging member by opening or closing movement of the lid body, and the accumulated urging force drives at least an opening operation of the lid body. Since the urging force which has been accumulated beforehand thus drives at least an opening operation of the lid body, the lid body can be opened easily without providing a motor or the like additionally, and the lid device can be produced at a low cost.

Here, the urging member is held by the lid body and has one end engaging the guide portion. Therefore, the urging member moves in association with opening or closing movement of the lid body, and at the same time the engaging end of the urging member is guided by and moves on the guide portion. Therefore, the urging member is stretched or compressed and thereby an urging force is accumulated in association with part of opening and closing movement of the lid body and the accumulated urging force drives an opening operation of the lid body.

In the lid device according to the present invention, the first guide portion for guiding the engaging end when the lid body moves from the closed position to the open position comprises an initial guide portion connected to the closed end portion, a later guide portion connected to the open end portion, and a connecting portion connecting the initial guide portion and the later guide portion. Namely, in an initial stage of the opening operation of the lid body, the engaging end is guided by the initial guide portion, while in a later stage of the opening operation of the lid body, the engaging end is guided by the later guide portion. When the engaging end is guided by the initial guide portion (hereinafter referred to as in the initial guide stage), the urging member releases a larger urging force than when the engaging end is guided by the later guide portion (hereinafter referred to as in the later guide stage). Therefore, in the initial stage of the opening operation of the lid body, the opening operation of the lid body is urged by a large force. Accordingly, even when the center of gravity of the lid body lies in the closing side of the lid body, a sufficient urging force is applied on the lid body and the lid body is securely opened.

When the lid device according to the present invention has the configuration (1), an urging force released by the urging member in the initial guide stage can be set larger than an urging force released by the urging member in the later guide stage by a simple mechanism.

When the lid device according to the present invention has the configuration (2), the angle formed by the fixed line segment and the initial line segment can be set large.

DESCRIPTION OF THE PREFERRED EMBODIMENTS

The lid device according to the present invention is suitably employed as a device for opening and closing an opening of a storage structure used in a small space as typified by a glove box mounted on a vehicle, but its application is not limited to this. The storage structure can be a variety of furniture products and home electric appliances and the lid device according to the present invention can be used as a device for opening and closing an opening of such a structure. For example, when the storage structure is a cabinet, cabinet doors and drawers are regarded as lid bodies. Moreover, for example, when the storage structure is a sliding table, the sliding table in itself is regarded as a lid body.

Hereinafter, a lid device of an embodiment of the present invention will be described with reference to FIGS. 1 to 5.

Figure 1:
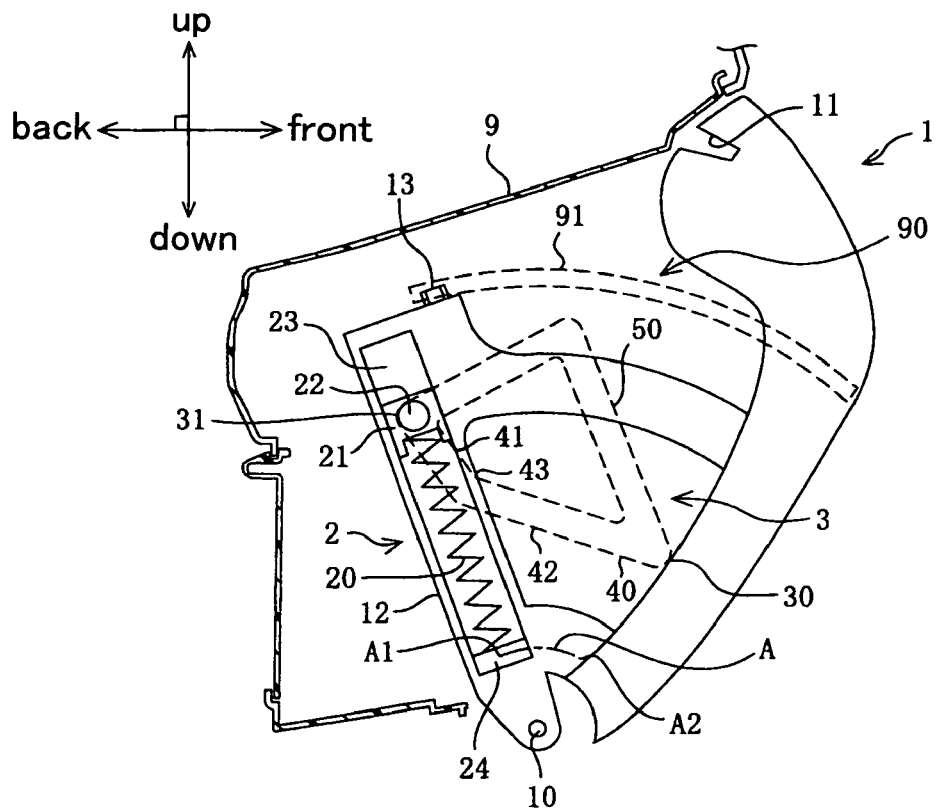
FIG. 1 is a schematic explanatory view illustrating a lid device of an embodiment in which an engaging end is placed at a closed end portion and a lid body is placed in a closed position.
Figure 2:
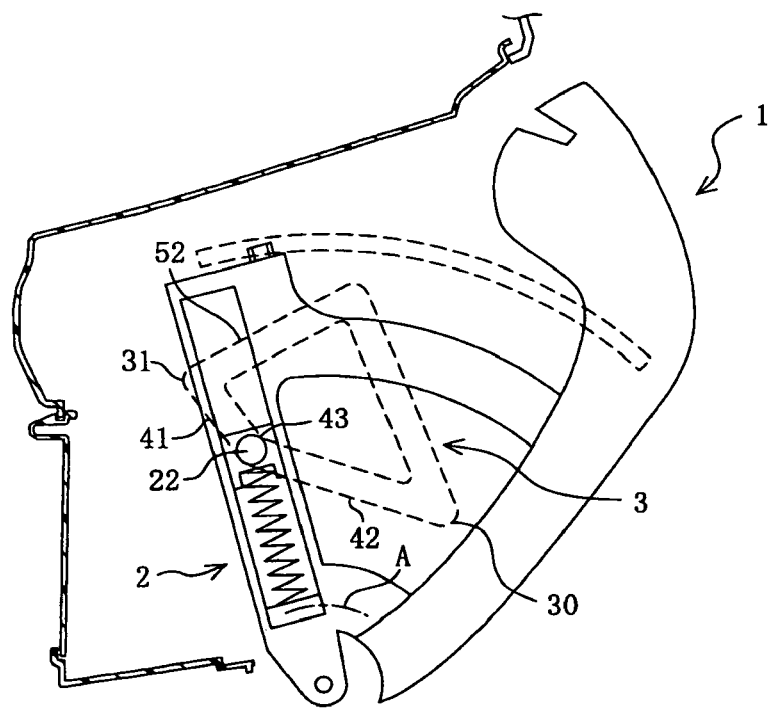
FIG. 2 is a schematic explanatory view illustrating the lid device of this embodiment in which during an opening operation of the lid body the engaging end is placed at a connection portion and the lid body is placed between the closed position and an open position.
Figure 3:
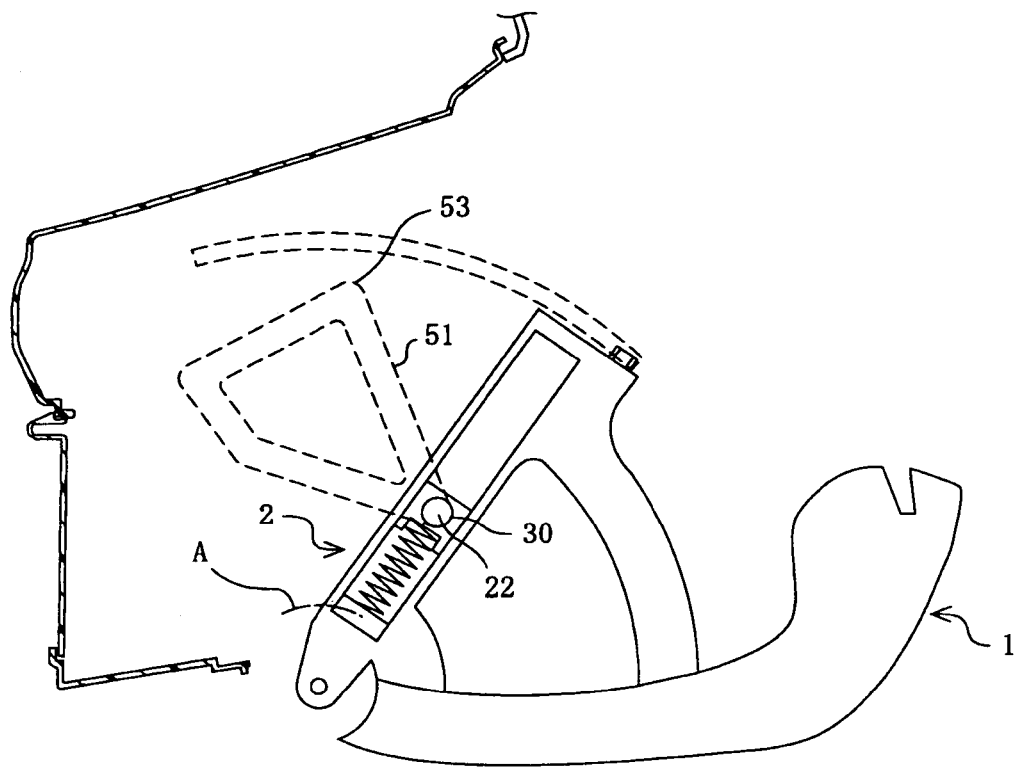
FIG. 3 is a schematic explanatory view illustrating the lid device of this embodiment in which the engaging end is placed at an open end portion and the lid body is placed in the open position.
Figure 4:
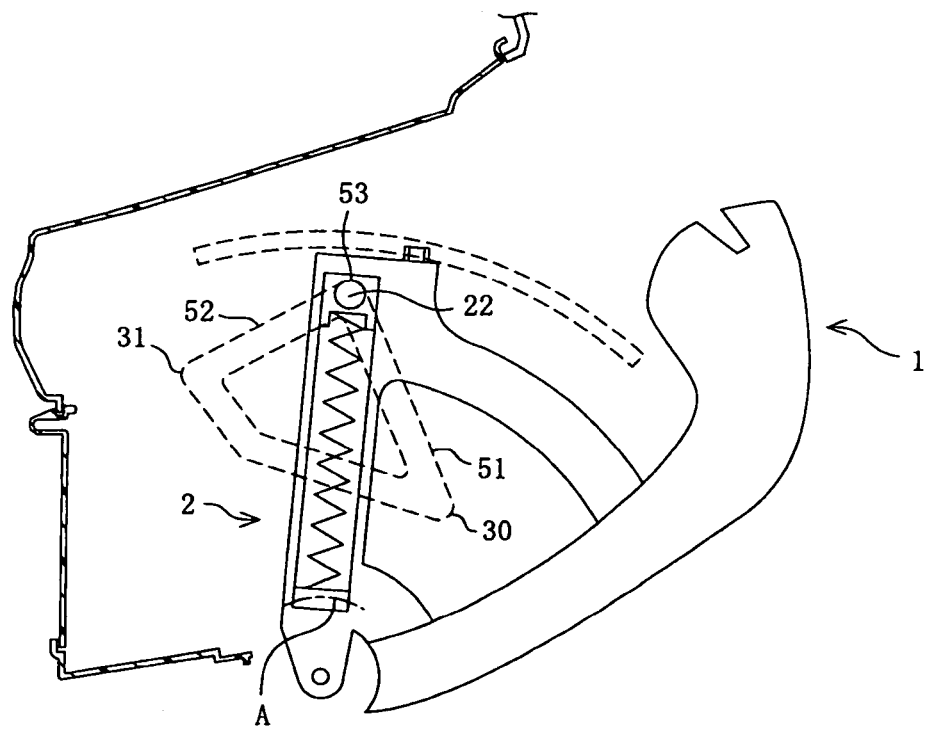
FIG. 4 is a schematic explanatory view illustrating the lid device of this embodiment in which during a closing operation of the lid body the engaging end is placed at a second guide portion and the lid body is placed between the closed position and the open position.
Figure 5:
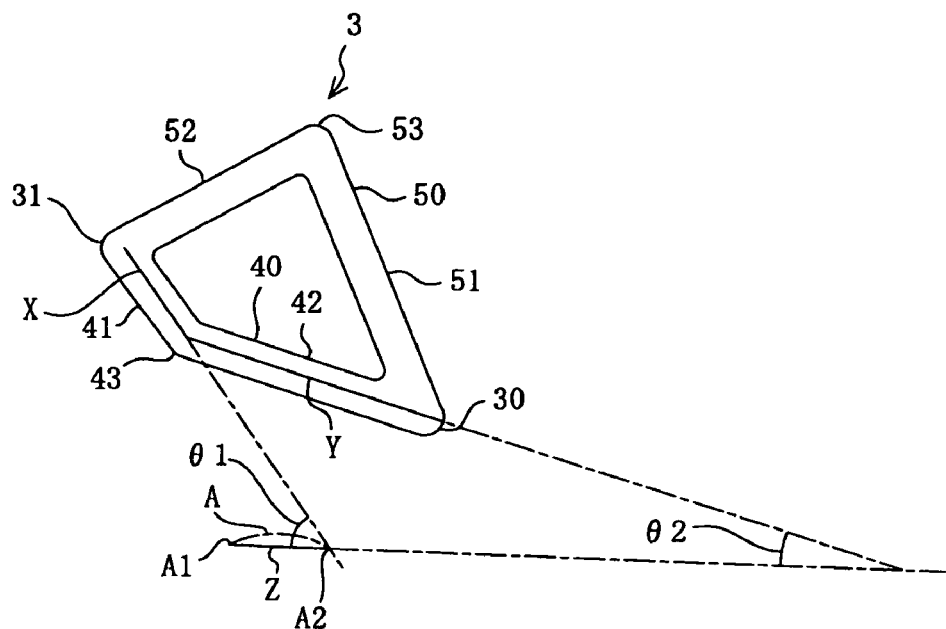
FIG. 5 is a schematic explanatory view illustrating a guide portion, a fixed line segment, an initial line segment and a later line segment in the lid device of this embodiment.

The lid device of this embodiment constitutes part of a glove box mounted in a passenger room of a vehicle, and opens and closes an opening of a storage structure which is a box-shaped glove box body having an opening on a side wall. The lid device of this embodiment has the above configurations (1) and (2). Schematic explanatory views of the lid device of this embodiment are shown in FIGS. 1 to 5. More specifically, FIG. 1 is a schematic explanatory view illustrating the lid device of this embodiment in which an engaging end is placed at a closed end portion and a lid body is placed in a closed position. FIG. 3 is a schematic explanatory view illustrating the lid device of this embodiment in which the engaging end is placed at an opening end portion and the lid body is placed in an open position. FIG. 2 is a schematic explanatory view illustrating the lid device of this embodiment in which during an opening operation of the lid body the engaging end is placed at a connection portion and the lid body is placed between the closed position and the open position. FIG. 4 is a schematic explanatory view illustrating the lid device of this embodiment in which during a closing operation of the lid body the engaging end is placed at a second guide portion and the lid body is placed between the closed position and the open position. FIG. 5 is a schematic explanatory view illustrating a guide portion, a fixed line segment, an initial line segment and a later line segment in the lid device of this embodiment. In the following description of this embodiment, directional terminology, such as "up", "down", "front", "back", is used with reference to those shown in FIG. 1.

The lid device of this embodiment comprises a lid body 1, an urging member 2 and a guide portion 3.

The lid body 1 has a pivotably supported portion 10 on its lower end. The pivotably supported portion 10 is pivotably supported by a lower end of a storage structure 9. The lid body 1 rotates around the pivotably supported portion 10 and moves between the closed position shown in FIG. 1 and the open position shown in FIG. 3. The lid body 1 closes an opening 90 when placed in the closed position shown in FIG. 1 and opens the opening 90 when placed in the open position shown in FIG. 3. The storage structure 9 is provided with a lock means not shown. The lid body 1 has a recessed hook portion 11 to engage the lock means. The lid body 1 is locked in the closed position by engagement of the lock means and the hook portion 11. The lock means has an operating portion, not shown, exposed to an outer surface of the lid device, and the lock is released upon depression of the operating portion. The lid body 1 has a leg portion 12 connected to the pivotably supported portion 10 and extending in a direction to cross the surface of the lid body 1. An end portion of the leg portion 12 opposite to the pivotably supported portion 10 is provided with a wheel-like rotating body 13. The rotating body 13 engages and rotates on a rail body 91 formed on the storage structure 9. The rail body 91 has a circular arc shape with a center on the pivotably supported portion 10. Therefore, the rotational direction of the lid body 1 is guided by the rail body 91 and the rotating body 13.

The urging member 2 comprises a spring portion 20, which is a coil spring, a joint portion 21 attached to one end of the spring portion 20, and a pin portion 22 held by the joint portion 21. The urging member 2 is attached to the leg portion 12 of the lid body 1. The urging member 2 is held inside a hollow restricting member 23. The restricting member 23 has a long box-like shape and one of long surfaces is open. The inside of the restricting member 23 also has a long shape. The joint portion 21 has a frame shape shorter than the restricting member 23, and one of its longer surfaces and one shorter surface continuing from this longer surface are open. The joint portion 21 is held by the restricting member 23 in a manner to be movable inside the restricting member 23 in a longitudinal direction. The spring portion 20 has one end attached to the joint portion 21 and the other end, which is a fixed end 24, fixed to the restricting member 23. The spring portion 20 together with the joint portion 21 is held inside the restricting member 23 in a manner that its stretching and compressing directions correspond to the longitudinal direction of the restricting member 23. The joint portion 21 has a hole portion not shown. This hole portion is penetrated by the pin portion 22. The pin portion 22 has one end penetrating the guide portion 3 and thereby engages and is movable on the guide portion 3. The pin portion 22 is urged by a second spring portion, not shown, to come in pressure contact with the guide portion 3. The restricting member 23 is integrally fixed on the leg portion 12 of the lid body 1. The fixed end 24 is fixed to the lid body 1 by means of the restricting member 23.

The urging member 2 is guided by the guide portion 3 due to engagement of the pin portion 22 and the guide portion 3. Therefore, in the lid device of this embodiment, the pin portion 22 is an engaging end of the urging member 2. An urging force is accumulated in the urging member 2 by stretching the spring portion 20 and the urging force is released upon the stretched spring portion 20 being compressed again.

The fixed end 24 moves in association with rotation of the lid body 1. Therefore, a moving track A of the fixed end 24 (indicated by an alternate long and short dash line in the drawings; hereinafter simply referred to as the track A) draws a circular arc with a center on the pivotably supported portion 10. As shown in FIG. 1, when the lid body 1 is placed in the closed position, the fixed end 24 is placed in a closed fixed position A1. As shown in FIG. 3, when the lid body 1 is placed in the open position, the fixed end 24 is placed in an open fixed position A2. The fixed end 24 moves between the closed fixed position A1 and the open fixed position A2.

The guide portion 3 is formed in a groove shape integrally on a side wall of the storage structure 9. The guide portion 3 has an open end portion 30 at a lower front position and a closed end portion 31 at an upper back position. The closed end portion 31 and the open end portion 30 are connected to each other through a first guide portion 40 and a second guide portion 50. The first guide portion 40 connects the closed end portion 31 and the open end portion 30. The first guide portion 40 comprises an initial guide portion 41, a later guide portion 42 and a connecting portion 43. The initial guide portion 41 is connected to the closed end portion 31. The later guide portion 42 is connected to the open end portion 30. The connecting portion 43 connects the initial guide portion 41 and the later guide portion 42. As shown in FIG. 5, an initial line segment X connecting the connecting portion 43 and the closed end portion 31 extends in a direction to cross a fixed line segment Z connecting the closed fixed position A1 and the open fixed position A2. A later line segment Y connecting the connecting portion 43 and the open end portion 30 also extends in a direction to cross the fixed line segment Z. A shortest distance from the connecting portion 43 to the track A is shorter than a shortest distance from the closed end portion 31 to the track A. A shortest distance from the open end portion 30 to the track A is shorter than a shortest distance from the connecting portion 43 to the track A. In other words, a shortest distance from the first guide portion 40 to the track A gradually gets shorter from the closed end portion 31 towards the open end portion 30. Besides, an angle $\theta 1$ formed by the fixed line segment Z and the initial line segment X is greater than an angle $\theta 2$ formed by the later line segment Y and the fixed line segment Z. Therefore, a shortest distance from the initial guide portion 41 to the track A sharply gets shorter from the closed end portion 31 towards the connecting portion 43. A shortest distance from the later guide portion 42 to the track A slowly gets shorter from the connecting portion 43 towards the open end portion 30. Moreover, the initial line segment X connecting the connecting portion 43 and the closed end portion 31 is shorter than the later line segment Y connecting the connecting portion 43 and the open end portion 30.

The second guide portion 50 connects the open end portion 30 and the closed end portion 31. The second guide portion 50 comprises an accumulating portion 51, a closing guide portion 52 and an inflection portion 53. The accumulating portion 51 is connected to the open end portion 30. The closing guide portion 52 is connected to the closed end portion 31. The inflection portion 53 connects the accumulating portion 51 and the closing guide portion 52. A shortest distance from the inflection portion 53 to the track A is longer than the shortest distance from the open end portion 30 to the track A. The shortest distance from the closed end portion 31 to the track A is shorter than the shortest distance from the inflection portion 53 to the track A. In other words, a shortest distance from the accumulating portion 51 to the track A gradually gets longer from the open end portion 30 towards the inflection portion 53. A shortest distance from the closing guide portion 52 to the track A gradually gets shorter from the inflection portion 53 towards the closed end portion 31. The inflection portion 53 is a portion of the second guide portion 50 having a longest distance from the track A.

The operation of the lid device of this embodiment is as follows.

Upon depression of the operating portion of the lock means with the lid body 1 placed in the closed position, the lid body 1 is released from the locked state. As shown in FIG. 1, when the lid body 1 is placed in the closed position, the pin portion 22 (the engaging end) of the urging member 2 is placed at the closed end portion 31 of the guide portion 3. In this state, the spring portion 20 of the urging member 2 is stretched and an urging force is accumulated in the urging member 2.

The shortest distance from the first guide portion 40 to the track A gradually gets shorter from the closed end portion 31 towards the open end portion 30. On the other hand, since the urging member 2 is stretched and an urging force is accumulated therein, the urging member 2 tends to release the urging force by compression. Therefore, the pin portion 22 of the urging member 2 slides on the first guide portion 40 in a direction to compress the urging member 2, that is to say, the shortest distance from the track A gets shorter. Accordingly, the pin portion 22 moves from the closed end portion 31 towards the open end portion 30 and the lid body 1 fixed to the urging member 2 also moves towards the open end portion 30 by being pulled by the urging member 2. Thus, the lid body 1 moves from the closed position to the open position, thereby being opened.

Here, the shortest distance from the initial guide portion 41 to the track A sharply gets shorter from the closed end portion 31 towards the connecting portion 43. Therefore, when the pin portion 22 is guided by the initial guide portion 41 (in the initial guide stage), the urging member 2 releases a large urging force. Accordingly, even when the center of gravity of the lid body 1 lies on the closing side of the lid body 1 (the back side in FIG. 1), a sufficient urging force is applied on the lid body 1 and the lid body 1 is securely opened.

The shortest distance from the later guide portion 42 to the track A slowly gets shorter from the connecting portion 43 towards the open end portion 30. Therefore, when the pin portion 22 is guided by the later guide portion 42 (in the later guide stage), an urging force released by the urging member 2 is smaller than an urging force released by the urging member 2 in the initial guide stage. However, if a large urging force is released in the initial guide stage, the lid body 1 is opened at least to a position where the pin portion 22 is placed at the connecting portion 43 (the position shown in FIG. 2; hereinafter referred to as the half-open position). Therefore, an inconvenience of the lid body 1 being not opened properly and locked again in the closed position can be avoided. Moreover, if the lid body 1 is opened to the half-open position, the center of gravity of the lid body 1 moves in the opening direction (the front side in FIG. 1). Therefore, in the later guide stage the lid body 1 is opened by a smaller urging force compared with in the initial guide stage.

Moreover, when the lid body 1 is placed in the closed position, the urging member 2 is stretched and an urging force is accumulated therein. In this state, the pin portion 22 is hard to move in a direction to further stretch the urging member 2. In the lid device of this embodiment, the shortest distance from the closing guide portion 52, which is connected to the closed end portion 31, to the track A gradually gets longer from the closed end portion 31 towards the inflection portion 53. Therefore, when the pin portion 22 moves from the closed end portion 31 to the closing guide portion 52, the urging member 2 is further stretched. Therefore, the pin portion 22 placed at the closed end portion 31 does not move towards the closing guide portion 52 and securely moves towards the initial guide portion 41. Therefore, the lid body 1 is more securely opened.

Besides, since the initial line segment X is shorter than the later line segment Y, the angle θ1 formed by the fixed line segment Z and the initial line segment X can be set large. Therefore, the initial guide portion 41 can be shaped in a manner that the shortest distance from the track A sharply gets shorter from the closed end portion 31 towards the connecting portion 43. Owing to this configuration, the urging member 2 releases a large urging force in the initial guide stage.

When the lid body 1 is closed from the open position shown in FIG. 3, first the lid body 1 is manually rotated towards the closed position. At this time, in association with the closing operation of the lid body 1, the pin portion 22 enters the accumulating portion 51. Since the shortest distance from the accumulating portion 51 to the track A gradually gets longer from the open end portion 30 towards the inflection portion 53, when the pin portion 22 is guided by the accumulating portion 51, the urging member 2 is stretched and an urging force is accumulated therein. When the lid body 1 is closed to the position where the pin portion 22 is placed at the inflection portion 53 (as shown in FIG. 4), the urging member 2 is stretched to the maximum degree and a large urging force is accumulated in the urging member 2. The shortest distance from the closing guide portion 52, which is connected to the inflection portion 53, to the track A gradually gets shorter towards the closed end portion 31. Therefore, when the pin portion 22 reaches the closing guide portion 52, the pin portion 22 slides on the closing guide portion 52 in a direction to compress the urging member 2. That is to say, the pin portion 22 slides towards the closed end portion 31. Therefore, the lid body 1 fixed to the urging member 2 also moves towards the closed end portion 31 by being pulled by the urging member 2. Thus, the lid body 1 moves from the open position to the closed position, thereby being closed.

Now, other embodiments of the invention will be described hereinafter.

Figure 6:
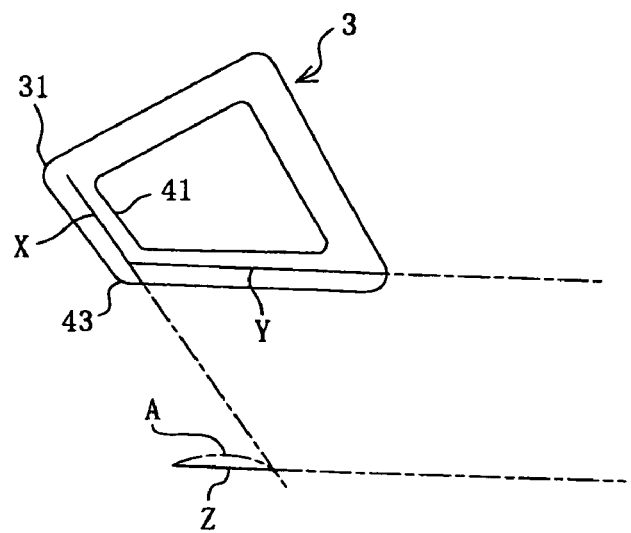
FIG. 6 is a schematic explanatory view illustrating a guide portion, a fixed line segment, an initial line segment and a later line segment in a lid device of another embodiment of the present invention.

In the lid device of the above embodiment, both the initial line segment X and the later line segment Y extend in directions to cross the fixed line segment Z. Besides, since the shortest distance from the connecting portion 43 to the trace A is set shorter than the shortest distance from the closed end portion 31 to the trace A and the shortest distance from the open end portion 30 to the trace A is set shorter than the shortest distance from the connecting portion 43 to the trace A, the shortest distance from the first guide portion 40 to the trace A gradually gets shorter from the closed end portion 31 towards the open end portion 30. However, for instance, as shown in FIG. 6, the lid device can be constructed in a manner that only the initial line segment X extends in a direction to cross the fixed line segment Z, the later line segment Y extends in a direction parallel to the fixed line segment Z, and the shortest distance from the initial guide portion 41 to the trace A gradually gets shorter from the closed end portion 31 towards the connecting portion 43. In this case, an opening operation of the lid body is urged by the urging member only in the initial guide stage, and is not urged by the urging member in the later guide stage. However, if the opening operation of the lid body is urged by the urging member in the initial guide stage, an inconvenience of the lid body being locked again in the closed position can be avoided. Besides, if the lid device is constructed in a manner that the center of gravity of the lid body moves in the opening direction when the lid body is opened to the half-opening position, the lid body is opened under its own gravity in the later guide stage.

Figure 7:
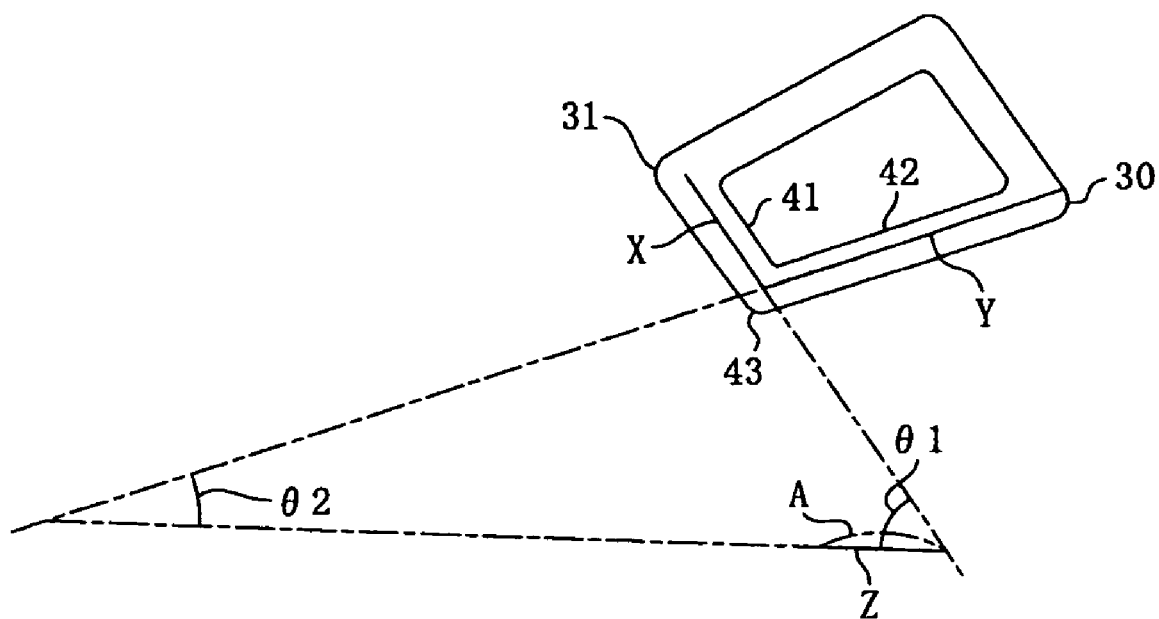
FIG. 7 is a schematic explanatory view illustrating a guide portion, a fixed line segment, an initial line segment and a later line segment in a lid device of still another embodiment of the present invention.

Alternatively, for instance, as shown in FIG. 7, the lid device can be constructed in a manner that the initial line segment X and the later line segment Y extend in directions to cross the fixed line segment Z, the shortest distance from the initial guide portion 41 to the trace A gradually gets shorter from the closed end portion 31 towards the connecting portion 43, and the shortest distance from the later guide portion 42 to the trace A gradually gets longer from the connecting portion 43 towards the open end portion 30. In this case, the opening operation of the lid body in the later guide stage is not urged by the urging member, but the opening operation of the lid body in the initial guide stage is urged by the urging member. Therefore, an inconvenience of the lid body 1 being locked again in the closed position can be avoided. In this case, if the angle θ1 formed by the fixed line segment Z and the initial line segment X is set larger than the angle θ2 formed by the later line segment Y and the fixed line segment Z, the shortest distance from the later guide portion 42 to the trace A can gradually get longer from the connecting portion 43 towards the opening end portion 30. Therefore, the opening operation of the lid body in the later guide stage does not require an excessively large force.

In the lid device of the present invention, the angle θ1 formed by the fixed line segment Z and the initial line segment X can be appropriately determined with the weight of the lid body 1, the center of gravity of the lid body 1 in the closed position, and so on. As the angle θ1 formed by the fixed line segment Z and the initial line segment X is greater, the opening operation of the lid body 1 in the initial guide stage is driven by a larger urging force.

The lid device of the embodiment shown in FIGS. 1 to 5 employs the urging member 2 which accumulates an urging force by stretch and releases the urging force by compression. However, the lid device of the present invention can employ an urging member 2 which accumulates an urging force by compression and releases the urging force by stretch. In this case, for instance, if the initial line segment X extends in a direction to cross the fixed line segment Z and the shortest distance from the connecting portion 43 to the trace A is set longer than the shortest distance from the closed end portion 31 to the trace A, the opening operation of the lid body 1 in the initial guide stage can be urged by the urging member in a similar way to the lid device of the embodiment shown in FIGS. 1 to 5.

In the lid device of the embodiment shown in FIGS. 1 to 5, the closing guide portion 52 is provided to the second guide portion 50 and part of the closing operation of the lid body 1 is urged by the urging member 2. However, in a lid device of the present invention, the second guide portion 50 can be constituted only by the accumulating portion 51.

In a lid device of the present invention, the second guide portion 50 and the first guide portion 40 can be commonly used. In other words, the engaging end can be guided by the first guide portion 40 when the lid body 1 moves both from the closed position to the open position and from the open position to the closed position.

The present invention may be practiced or embodied in still other ways without departing from the spirit or essential character thereof. The preferred embodiments described herein are therefore illustrative and not restrictive, the scope of the invention being indicated by the appended claims rather than by the foregoing description and all variations which come within the meaning of the claims are intended to be embraced therein.

What is claimed is:

1. A lid device, comprising:
   a lid body, which moves between an open position for opening an opening of a storage structure and a closed position for closing said opening of said storage structure;
   a guide portion formed on said storage structure; and
   an urging member having one end fixed to said lid body so as to be held by said lid body and the other end engaging and guided by said guide portion so as to be stretched or compressed and thereby accumulate an urging force in association with opening and closing movements of said lid body, wherein
   the fixed end of the urging member follows a fixed end path when said lid body is moved between the open and closed positions;
   said urging force drives at least an opening operation of said lid body,
   said guide portion comprises
   a closed end portion in which said engaging end is placed when said lid body is placed in said closed position;
   an open end portion in which said engaging end is placed when said lid body is placed in said open position; a first guide portion connecting said closed end portion and said open end portion and guiding said engaging end when said lid body moves from said closed position to said open position; and
   a second guide portion connecting said closed end portion and said open end portion and guiding said engaging end when said lid body moves from said open position to said closed position;
   said first guide portion comprises
   an initial guide portion connected to said closed end portion,
   a later guide portion connected to said open end portion; and
   a connecting portion connecting said initial guide portion and said later guide portion;
   the second guide portion comprises
   an accumulating portion, which is connected to the open end portion;
   a closing guide portion, which is connected to the closed end portion; and
   an inflection portion, which is connected to the accumulating portion and the closing guide portion;
   said urging member releases a larger urging force when said engaging end is guided by said initial guide portion than when said engaging end is guided by said later guide portion;
   a minimum distance between the fixed end path and the open end portion is less than a minimum distance between the fixed end path and the closed end portion; and
   a minimum distance between the fixed end path and the closed end portion is less than a minimum distance between the fixed end path and the inflection portion.

2. A lid device according to claim 1, wherein
   a fixed line segment connecting a closed fixed position in which said fixed end is placed when said lid body is placed in said closed position and an open fixed position in which said fixed end is placed when said lid body is placed in said open position, and an initial line segment connecting said connecting portion and said closed end portion extend in directions to cross each other, and
   an angle formed by said fixed line segment and said initial line segment is greater than an angle formed by a later line segment connecting said connecting portion and said open end portion, and said fixed line segment.

3. A lid device according to claim 2, wherein said initial line segment is shorter than said later line segment.

4. A lid device according to claim 1, wherein the lid is constructed so that the center of gravity of the lid body moves in the opening direction when the lid body is opened to a half-open position, and the lid body is opened by gravity in a later stage of opening.

5. A lid device, comprising:
   a lid body, which moves between a fully open position for opening a storage structure and a fully closed position for closing the storage structure;
   a guide portion formed on the storage structure, wherein the guide portion forms a guide path; and
   a spring, a first end of which is fixed to the lid body and a second end of which is fixed to a joint portion, wherein the joint portion follows the guide path, so that the spring is expanded or compressed in accordance with opening and closing movements of the lid body, wherein
   the fixed end of the urging member follows a fixed end path when said lid body is moved between the open and closed positions, when the lid is opened by an operator, the joint applies force of the spring to the lid body that tends to open the lid body, the guide portion includes a closed end portion, at which the joint portion is located when the lid body is in the fully closed position;

an open end portion, at which the joint portion is located when the lid body is in the fully open position;

a first guide portion, which connects the closed end portion and the open end portion, wherein the first guide portion guides the joint portion when the lid body moves from the fully closed position to the fully open position; and a second guide portion, which connects the closed end portion and the open end portion, the second guide portion guides the joint portion when the lid body moves from the fully open position to the fully closed position, the first guide portion includes an initial guide portion connected to the closed end portion, a later guide portion connected to the open end portion, and a connecting portion, which is located between the initial guide portion and the later guide portion, so that the joint portion travels firstly along the initial guide portion, secondly through the connecting portion and thirdly along the later guide portion when the lid travels from the fully open position to the fully closed position, the second end of the spring moves toward the first end of the spring when the lid moves from the fully open position to the fully closed position, and the second end of the spring moves toward the first end of the spring by a greater distance when the joint portion is guided by the initial guide portion than when the joint portion is guided by the later guide portion when the lid moves from the fully closed position to the fully open position, the second guide portion comprises an accumulating portion, which is connected to the open end portion;

a closing guide portion, which is connected to the closed end portion; and an inflection portion, which is connected to the accumulating portion and the closing guide portion;

a minimum distance between the fixed end path and the open end portion is less than a minimum distance between the fixed end path and the closed end portion, and a minimum distance between the fixed end path and the closed end portion is less than a minimum distance between the fixed end path and the inflection portion.

6. A lid device according to claim 5, wherein a fixed line segment connects a closed fixed position, at which the first end of the spring is located when the lid body is in the fully closed position, and an open fixed position, at which the first end of the spring is located when the lid body is placed in the fully open position, an initial line segment connects the connecting portion and the closed end portion, a later line segment connects the connecting portion and the open end portion, the fixed line segment and the initial line segment intersect each other, the fixed line segment and the later line segment intersect each other, and an angle formed by the fixed line segment and the initial line segment is greater than an angle formed by the later line segment and the fixed line segment.

7. A lid device according to claim 6, wherein the initial line segment is shorter than the later line segment.

8. A lid device according to claim 5, wherein the lid is constructed so that the center of gravity of the lid body moves in the opening direction when the lid body is moved from the fully closed position to a point at which the joint portion is located at the connecting portion, and the lid body is opened by gravity when the joint portion is guided by the later guide portion.

* * * * *